(12) United States Patent
Morikawa

(10) Patent No.: US 12,192,736 B2
(45) Date of Patent: Jan. 7, 2025

(54) PROCESSING APPARATUS AND NON-TRANSITORY COMPUTER-READABLE MEDIUM

(71) Applicant: YAMAHA CORPORATION, Hamamatsu (JP)

(72) Inventor: Tadashi Morikawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 207 days.

(21) Appl. No.: 17/941,403

(22) Filed: Sep. 9, 2022

(65) Prior Publication Data

US 2023/0084717 A1    Mar. 16, 2023

(30) Foreign Application Priority Data

Sep. 14, 2021 (JP) ................. 2021-149101

(51) Int. Cl.
H04R 5/02 (2006.01)
H04S 7/00 (2006.01)

(52) U.S. Cl.
CPC ............. H04S 7/30 (2013.01); *H04S 2400/11* (2013.01)

(58) Field of Classification Search
CPC .............................. H04S 7/30; H04S 2400/11
USPC .................................................. 381/303, 300
See application file for complete search history.

(56) References Cited

U.S. PATENT DOCUMENTS

2021/0306794 A1* 9/2021 Shirakihara ............. G06F 3/167

FOREIGN PATENT DOCUMENTS

| EP | 1746522 | A2 | 1/2007 |
| EP | 3885894 | A2 | 9/2021 |
| JP | 2018074280 | A | 5/2018 |

OTHER PUBLICATIONS

Verheijen "Sound reproduction by Wave Field Synthesis", Jan. 1998 (Year: 1998).*

(Continued)

*Primary Examiner* — Ammar T Hamid
(74) *Attorney, Agent, or Firm* — ROSSI, KIMMS & McDOWELL LLP

(57) ABSTRACT

An information processing method receives settings of a plurality of pieces of information on a plurality of physical spaces that respectively correspond to a plurality of pieces of information on a plurality of logical spaces, receives a first group of a plurality of pieces of first acoustic image localization information that indicates a position of an acoustic image to be localized in each of the plurality of logical spaces using first coordinates in the plurality of logical spaces, receives a change in one piece of first acoustic image localization information, among the first group of the plurality of pieces of first acoustic image localization information, changes other pieces of first acoustic image localization information, among the first group of the plurality of pieces of first acoustic image localization, in response to the received change in the one piece of first acoustic image localization information, and transforms the first group of the plurality of pieces of first acoustic image localization information respectively into a plurality of pieces of second acoustic image localization information using second coordinates in the plurality of physical spaces.

9 Claims, 16 Drawing Sheets

(56) References Cited

OTHER PUBLICATIONS

Verheijen. "Sound Reproduction by Wave Field Synthesis" Chapter 4: Concept and Implementation of WFS Reproduction, Jan. 1998, pp. 1-27. Cited in NPL 2.
Extended European Search Report issued in European Application No. 22195329.2 mailed Feb. 15, 2023.

* cited by examiner

FIG.9
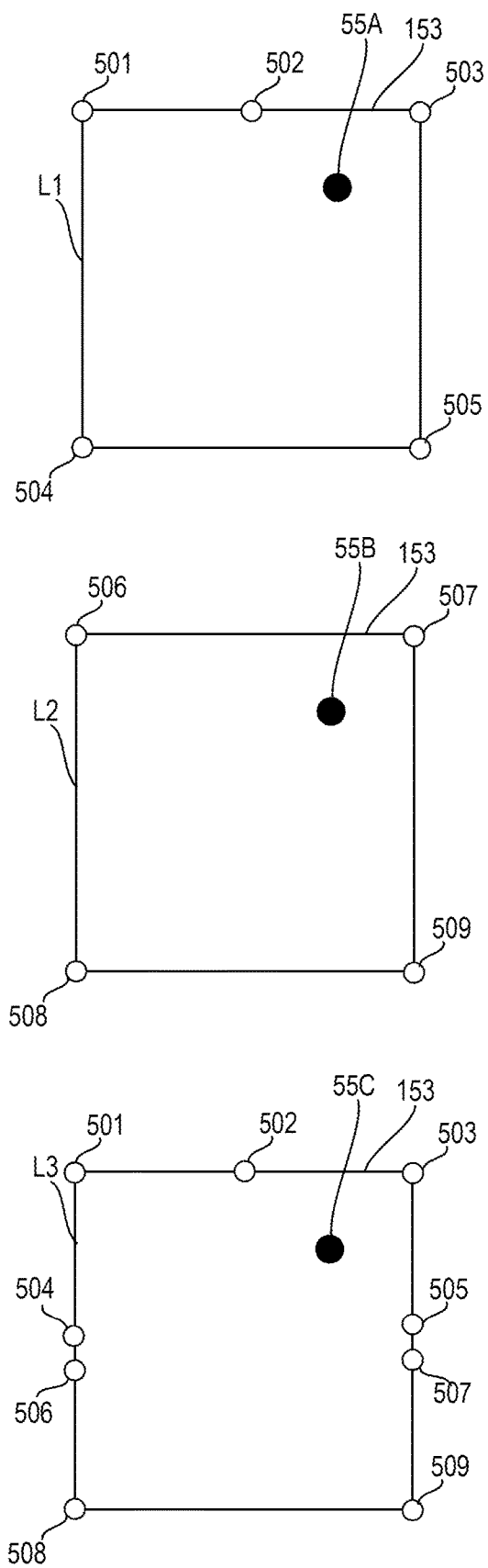
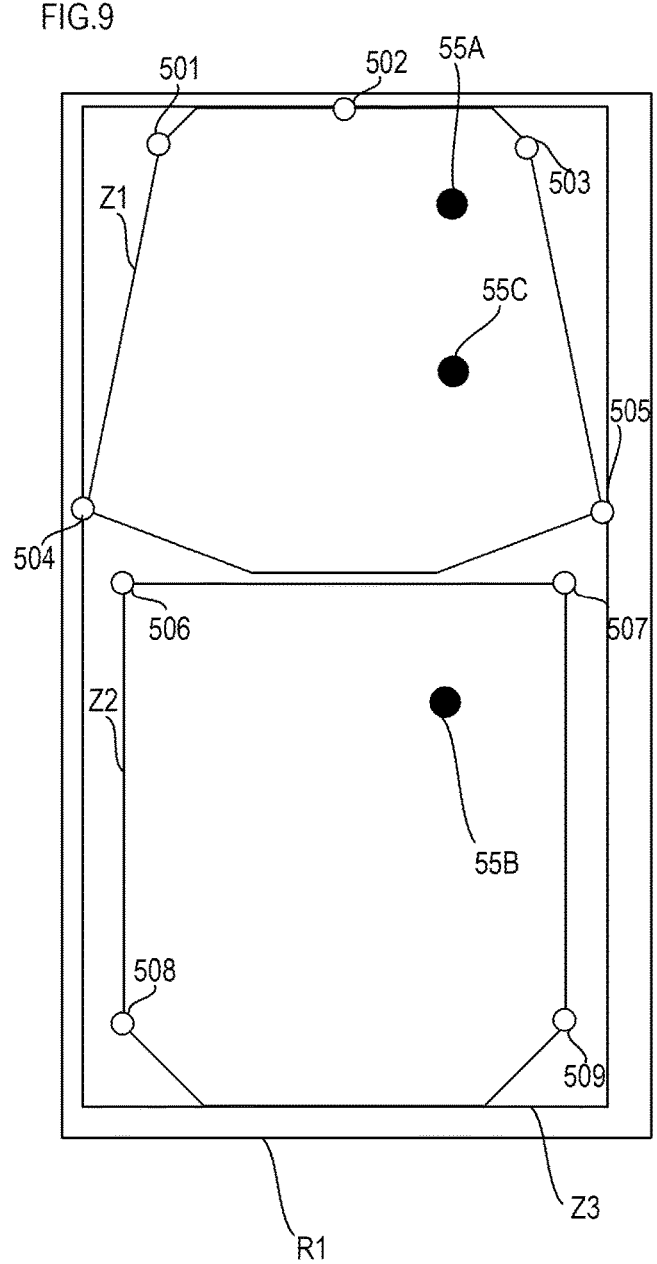

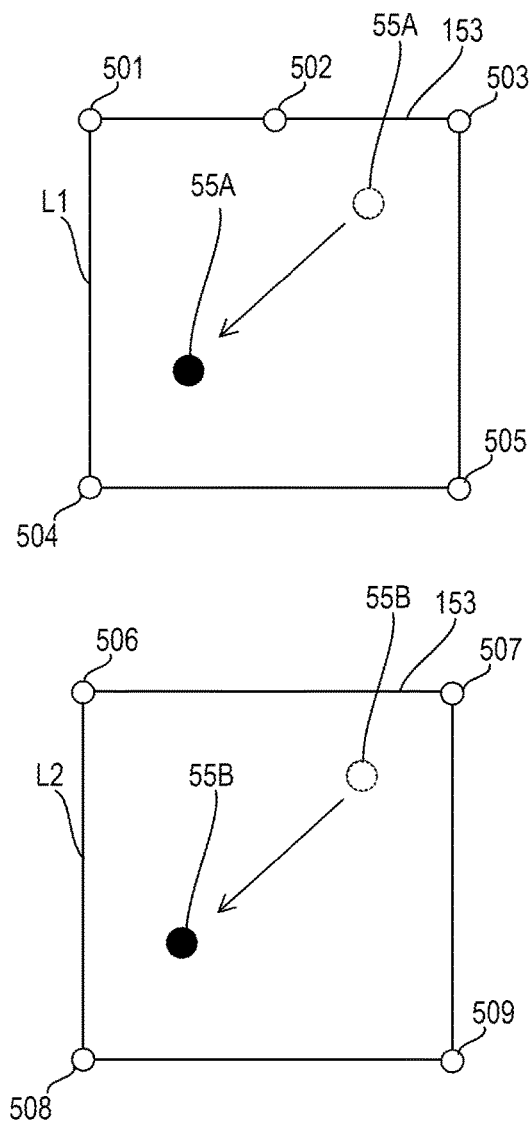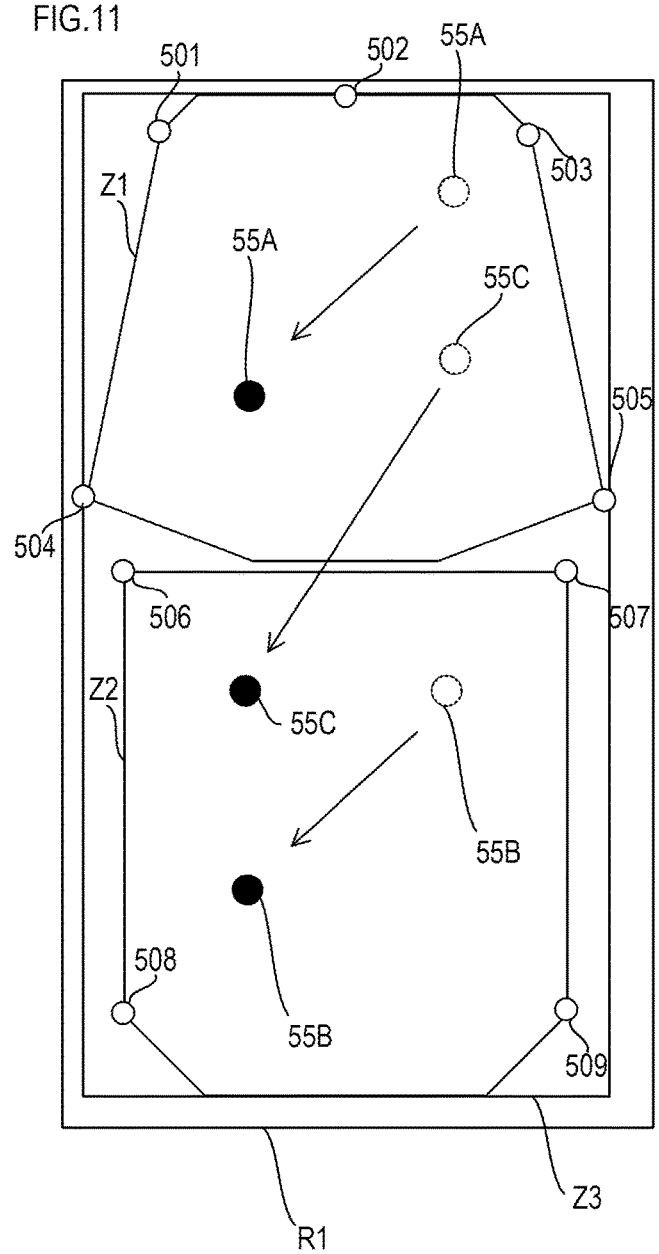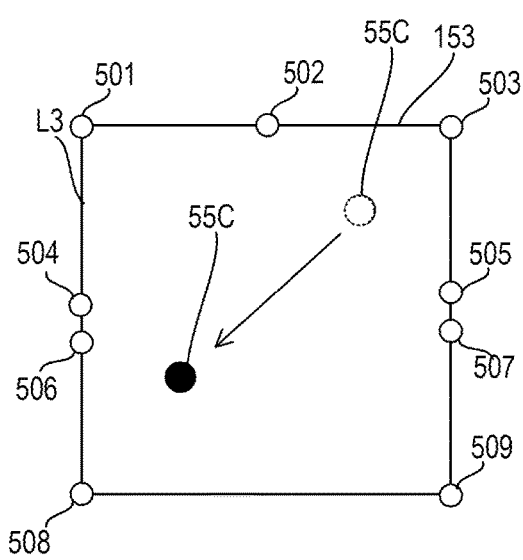
FIG.11

FIG.12

| SOUND SOURCE | Zone | | |
|---|---|---|---|
| | Z1 | Z2 | Z3 |
| 55A | ✓ | | |
| 55B | | ✓ | |
| 55C | | | ✓ |

FIG.13

| SP | Zone | | |
|---|---|---|---|
| | Z1 | Z2 | Z3 |
| 501 | ✓ | | ✓ |
| 502 | ✓ | | ✓ |
| 503 | ✓ | | ✓ |
| 504 | ✓ | | ✓ |
| 505 | ✓ | | ✓ |
| 506 | | ✓ | ✓ |
| 507 | | ✓ | ✓ |
| 508 | | ✓ | ✓ |
| 509 | | ✓ | ✓ |

FIG.14

| SP | Zone | | |
|---|---|---|---|
| | Z1 | Z2 | Z3 |
| 501 | ✓ | | ✓ |
| 502 | ✓ | | |
| 503 | ✓ | | ✓ |
| 504 | ✓ | | |
| 505 | ✓ | | |
| 506 | | ✓ | |
| 507 | | ✓ | |
| 508 | | ✓ | ✓ |
| 509 | | ✓ | ✓ |

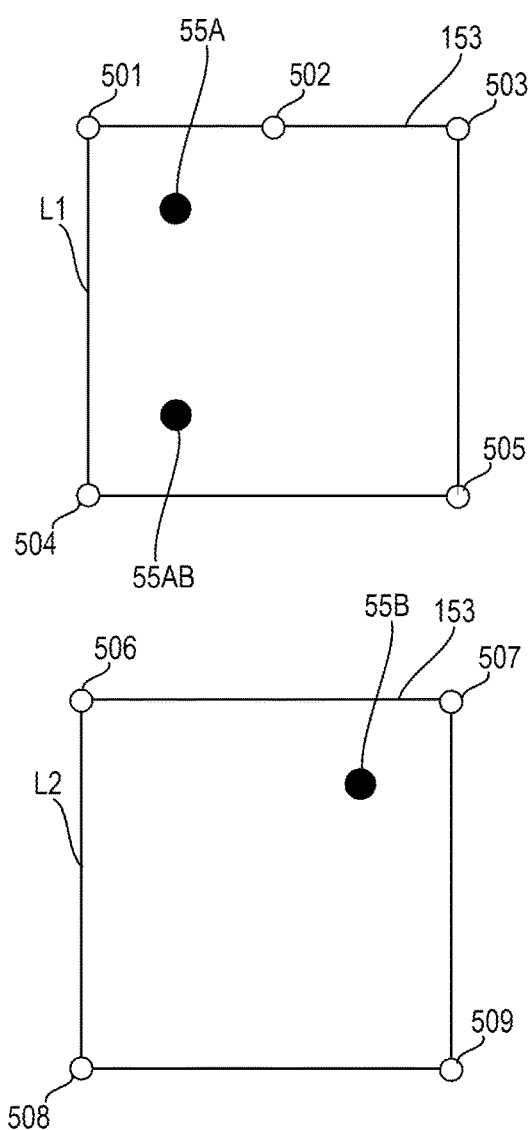
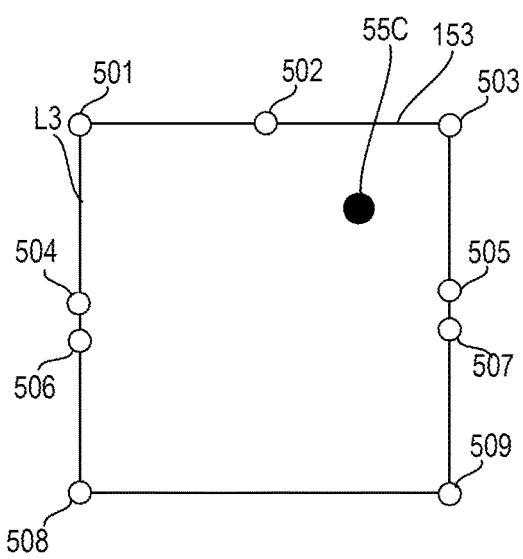
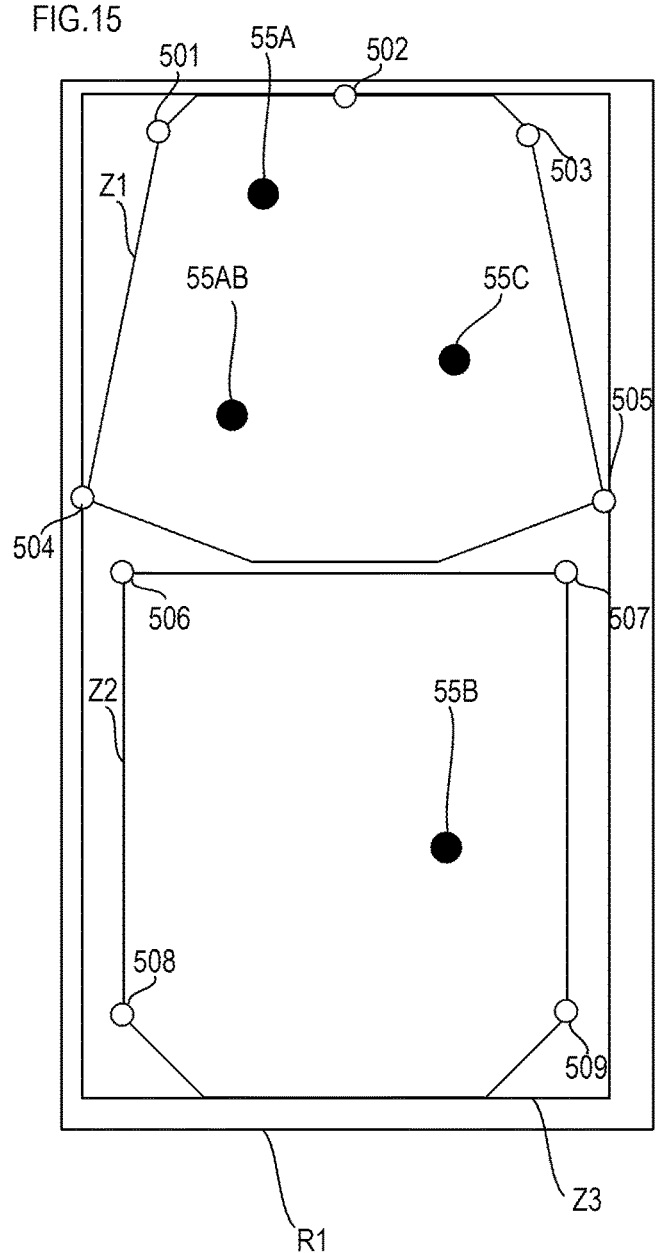
FIG.15

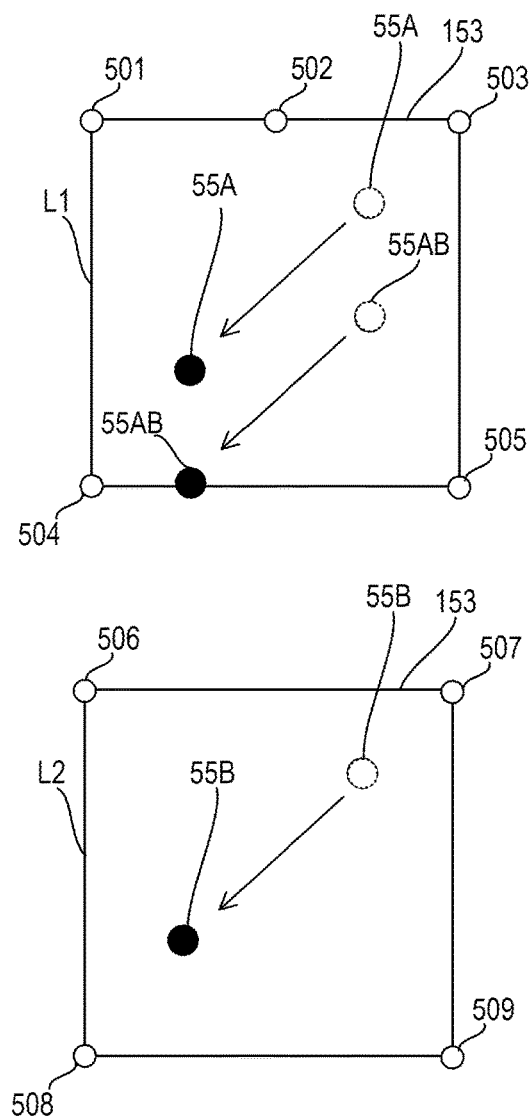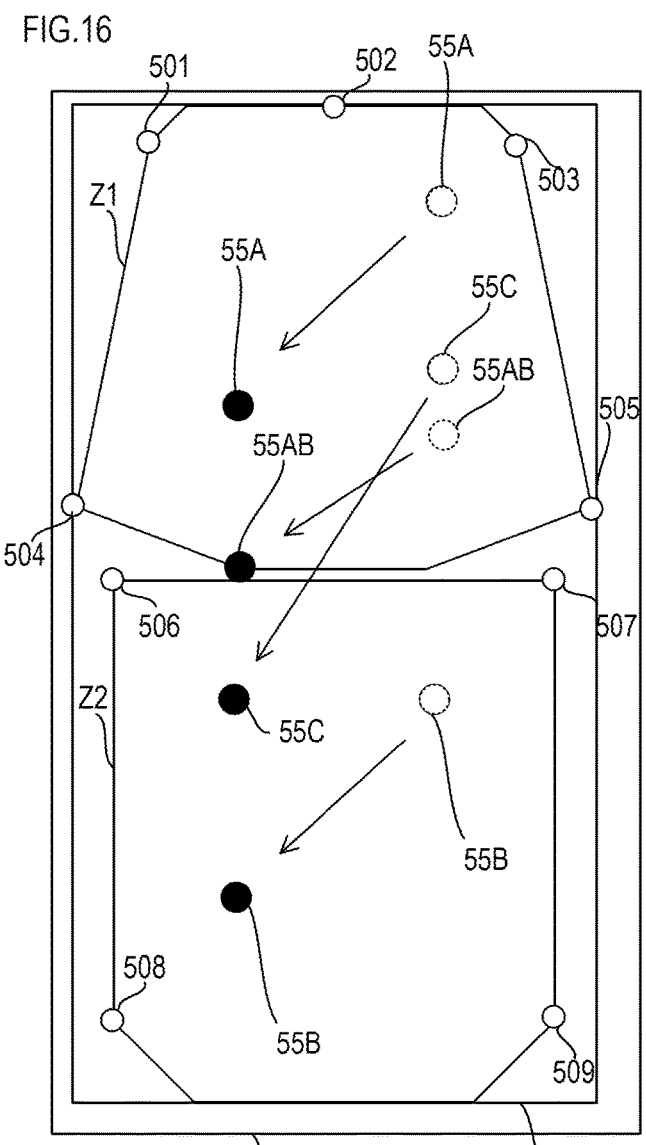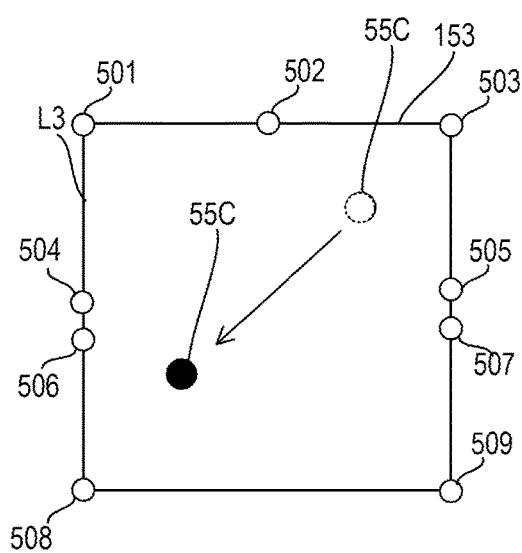
FIG.16

PROCESSING APPARATUS AND NON-TRANSITORY COMPUTER-READABLE MEDIUM

CROSS REFERENCE TO RELATED APPLICATIONS

This Nonprovisional application claims priority under 35 U.S.C. § 119(a) on Patent Application No. 2021-149101 filed in Japan on Sep. 14, 2021, the entire contents of which are hereby incorporated by reference.

BACKGROUND

Technical Field

An embodiment of the present disclosure relates to an information processing method and an information processing apparatus.

Background Information

A mixing console disclosed in Japanese Unexamined Patent Application Publication No. 2018-074280 receives coordinates of an acoustic image localization point in a rectangular parallelepiped space. The mixing console disclosed in Japanese Unexamined Patent Application Publication No. 2018-074280 calculates the volume of a sound to be outputted from a plurality of speakers placed in a space so that an acoustic image is localized in the received coordinates.

However, a physical space such as a concert hall is not limited to a rectangular parallelepiped space. Therefore, an apparatus such as the mixing console as disclosed in Japanese Unexamined Patent Application Publication No. 2018-074280, even though receiving coordinates of an acoustic image localization point in a rectangular parallelepiped space, does not consider the coordinates in the physical space, and thus may not be able to localize an acoustic image to a position as intended by a user, in some cases.

SUMMARY

In view of the foregoing, an object of an embodiment of the present disclosure is to provide an information processing method and an information processing apparatus that achieve acoustic image localization in consideration of a shape of a physical space.

An information processing method receives settings of a plurality of pieces of information on a plurality of physical spaces that respectively correspond to a plurality of pieces of information on a plurality of logical spaces, receives a first group of a plurality of pieces of first acoustic image localization information that indicates a position of an acoustic image to be localized in each of the plurality of logical spaces using first coordinates in the plurality of logical spaces, receives a change in one piece of first acoustic image localization information, among the first group of the plurality of pieces of first acoustic image localization information, changes other pieces of first acoustic image localization information, among the first group of the plurality of pieces of first acoustic image localization, in response to the received change in the one piece of first acoustic image localization information, and transforms the first group of the plurality of pieces of first acoustic image localization information respectively into a plurality of pieces of second acoustic image localization information using second coordinates in the plurality of physical spaces.

According to an embodiment of the present disclosure, acoustic image localization in consideration of a shape of a physical space is able to be achieved.

BRIEF DESCRIPTION OF THE DRAWINGS

FIG. 9 is a diagram showing an example of the acoustic image localization setting screen displayed on the display 15.

FIG. 11 is a diagram showing an example of the acoustic image localization setting screen displayed on the display 15.

FIG. 12 is a view showing an example of reproduction information.

FIG. 13 is a view showing a modification of the reproduction information.

FIG. 14 is a view showing a modification of the reproduction information.

FIG. 15 is a diagram showing an example of the acoustic image localization setting screen displayed on the display 15 in a case in which a plurality of sound sources 55A and sound sources 55AB are placed in a logical space L1 and acoustic image localization position information is edited.

FIG. 16 is a diagram showing an example of the acoustic image localization setting screen displayed on the display 15 in a case in which acoustic image localization position information of a plurality of sound sources 55A and sound sources 55AB that are defined as a second group is edited.

DETAILED DESCRIPTION

Figure 1:
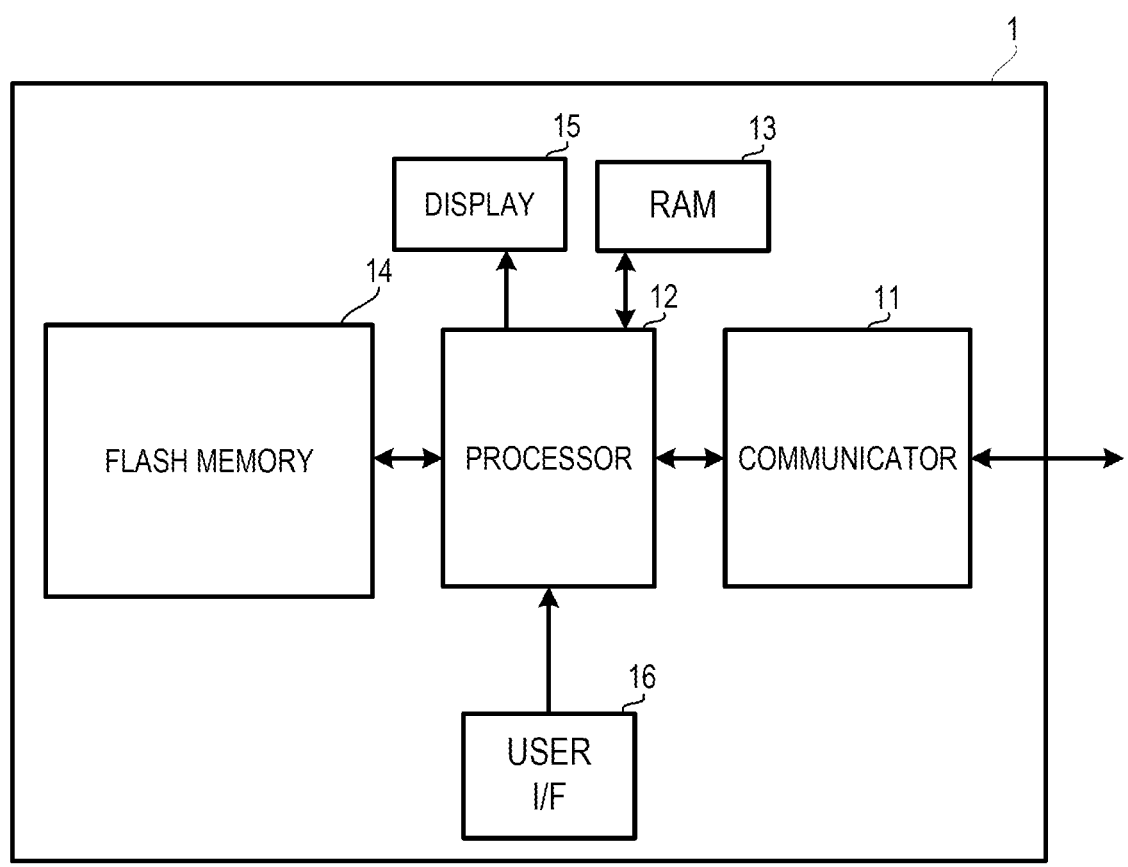
FIG. 1 is a block diagram showing a configuration of an information processing apparatus 1.

FIG. 1 is a block diagram showing a configuration of an information processing apparatus 1. The information processing apparatus 1 includes a communicator 11, a processor 12, a RAM 13, a flash memory 14, a display 15, and a user I/F 16.

The information processing apparatus 1 is a personal computer, a smartphone, a tablet computer, or the like. In addition, an acoustic device such as an audio mixer is also an example of an information processing apparatus.

The communicator 11 communicates with another apparatus such as a server. The communicator 11 has a wireless communication function such as Bluetooth (registered trademark) or Wi-Fi (registered trademark), for example, and a wired communication function such as a USB or a LAN. The communicator 11 obtains space information that shows the shape of a physical space such as a concert hall, for example. The space information is information that shows two-dimensional or three-dimensional coordinates using a certain position as a reference point (an origin). The space information is information that includes two-dimensional or three-dimensional coordinates such as CAD data that show the shape of a physical space such as a concert hall, for example.

The processor 12 is a CPU, a DSP, a SoC (System on a Chip), or the like, and is equivalent to a processor of the present disclosure. The processor 12 reads out a program from the flash memory 14 being a storage medium, and temporarily stores the program in the RAM 13, and thus performs various operations. It is to be noted that the program does not need to be stored in the flash memory 14. The processor 12, for example, may download the program from another apparatus such as a server and may temporarily store the program in the RAM 13, when necessary.

The display 15 is an LCD or the like. The display 15, for example, displays an acoustic image localization setting screen as shown in FIG. 2.

The user I/F 16 is an example of an operator. The user I/F 16 is a mouse, a keyboard, a touch panel, or the like. The user I/F 16 receives an operation from a user. It is to be noted that the touch panel may be stacked on the display 15.

Figure 2:
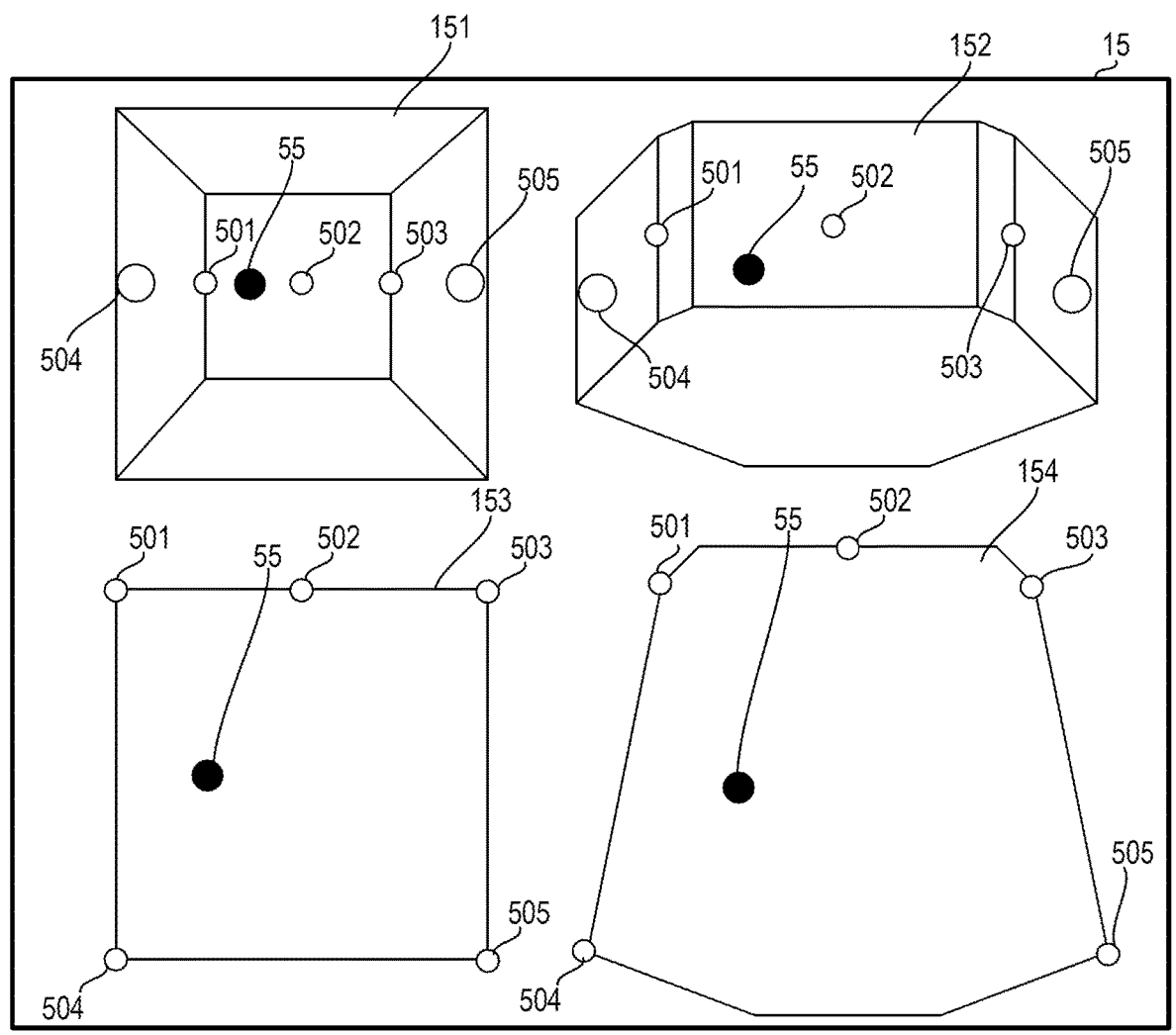
FIG. 2 is a view showing an example of an acoustic image localization setting screen displayed on a display 15.
Figure 3:
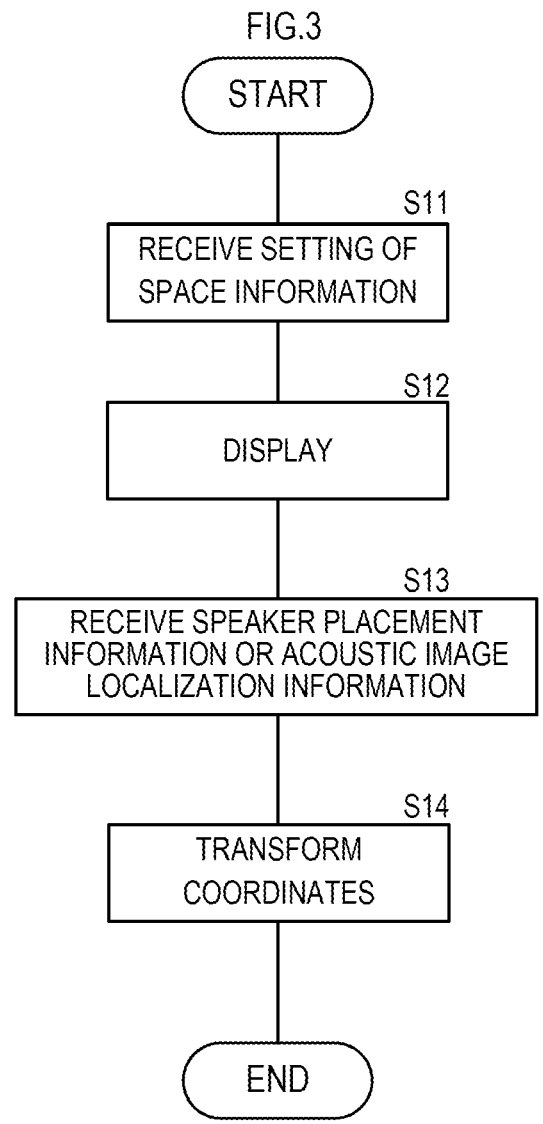
FIG. 3 is a flow chart showing an operation of a processor 12.

With reference to FIG. 2 and FIG. 3, the acoustic image localization setting screen will be described. FIG. 2 is a view showing an example of the acoustic image localization setting screen displayed on the display 15. FIG. 3 is a flow chart showing an operation of the processor 12. The acoustic image localization setting screen shown in FIG. 2 is an example of an edit screen of content. A user edits an acoustic image localization position of a sound source included in the content on the acoustic image localization setting screen. It is to be noted that the sound source means a sound of one or more objects (such as a moving object such as a helicopter, a talker, or a musical instrument, for example) in a predetermined content that includes a sound of a movie, a concert event, or an attraction, for example.

The display 15 displays a logical spatial image 151 of a logical coordinate system, and a physical spatial image 152 of a physical coordinate system. In this example, the display 15 displays the logical spatial image 151 on the upper left of the screen, and displays the physical spatial image 152 on the upper right of the screen. In addition, the display 15 displays a logical planar image 153 on the lower left of the screen, and displays a physical planar image 154 on the lower right of the screen.

The logical spatial image 151 is a rectangular parallelepiped as an example. The logical planar image 153 corresponds to a planar view of the logical spatial image 151. The physical spatial image 152 is an octagonal prism as an example. The physical planar image 154 corresponds to a planar view of the physical spatial image 152.

First, the processor 12 receives a setting of first space information being information corresponding to a logical space and second space information being information corresponding to a physical space such as a concert hall (S11).

The first space information defines logical coordinates. The logical coordinates include, for example, normalized coordinates having values from 0 to 1. In the present embodiment, the processor 12, although receiving a setting of space information on a rectangular parallelepiped as the first space information, may receive space information on various other shapes such as a polygonal pyramid, a prism, a polyhedron, a circular cylinder, a circular cone, or a sphere. In addition, the processor 12 may receive information on a two-dimensional space. The two-dimensional space includes, for example, a polygon configured by straight lines, a round shape configured by curved lines, or a composite shape configured by straight lines and curved lines.

The second space information defines physical coordinates. The physical coordinates are two-dimensional or three-dimensional coordinates included in CAD data or the like showing the shape of a physical space such as a concert hall. The processor 12 reads out information including the two-dimensional or three-dimensional coordinates such as CAD data or the like, from the flash memory 14 and then receives a setting of the second space information, for example.

Next, the processor 12 generates the logical spatial image 151, the physical spatial image 152, the logical planar image 153, and the physical planar image 154, and displays the images on the display 15 (S12). In the example of FIG. 2, the logical spatial image 151 is a cube elevation image and the logical planar image 153 is a square image. The physical spatial image 152 and the physical planar image 154 are images that imitate a real space such as a concert hall. The processor 12 generates the physical spatial image 152 and the physical planar image 154 based on the information including the two-dimensional or three-dimensional coordinates such as CAD data.

Next, the processor 12 receives speaker placement information or acoustic image localization information (S13). Both of the speaker placement information and the acoustic image localization information are coordinates in the logical coordinate system and are an example of first acoustic image localization information.

A user operates the user I/F 16 to edit the speaker placement information or the acoustic image localization information on the logical spatial image 151 or the logical planar image 153 shown in FIG. 2. For example, in the example of FIG. 2, the user, in the logical spatial image 151 and the logical planar image 153, places a speaker 501 placed on the left front, a speaker 502 placed in the center, a speaker 503 placed on the right front, a speaker 504 placed on the left rear, and a speaker 505 placed on the right rear. The speaker 501, the speaker 502, the speaker 503, the speaker 504, and the speaker 505 are placed at a middle in a height direction.

When the upper left corner in the logical planar image 153 is defined as an origin, the position of the speaker 501 is indicated by coordinates (x, y)=(0, 0). The position of the speaker 503 is indicated by coordinates (x, y)=(1, 0). The position of the speaker 502 is indicated by coordinates (x, y)=(0.5, 0). The position of the speaker 504 is indicated by coordinates (x, y)=(0, 1). The position of the speaker 505 is indicated by coordinates (x, y)=(1, 1).

In addition, in the example of FIG. 2, the user, in the logical spatial image 151 and the logical planar image 153, places the acoustic image localization position of a sound source 55 on the left of the center (between a left end and the center). In other words, the sound source 55 is indicated by coordinates (x, y)=(0.25, 0.5).

In the example of FIG. 2, the speakers 501 to 505 and the sound source in the height direction are all indicated by the coordinate z=0.5.

The processor 12, as shown in FIG. 2, for example, receives an operation to edit the speaker placement information or the acoustic image localization information of the sound source from the user and thus receives the speaker placement information or the acoustic image localization information (S13).

The processor 12 performs coordinate transformation based on the received speaker placement information or sound source position information (S14).

Figure 4:
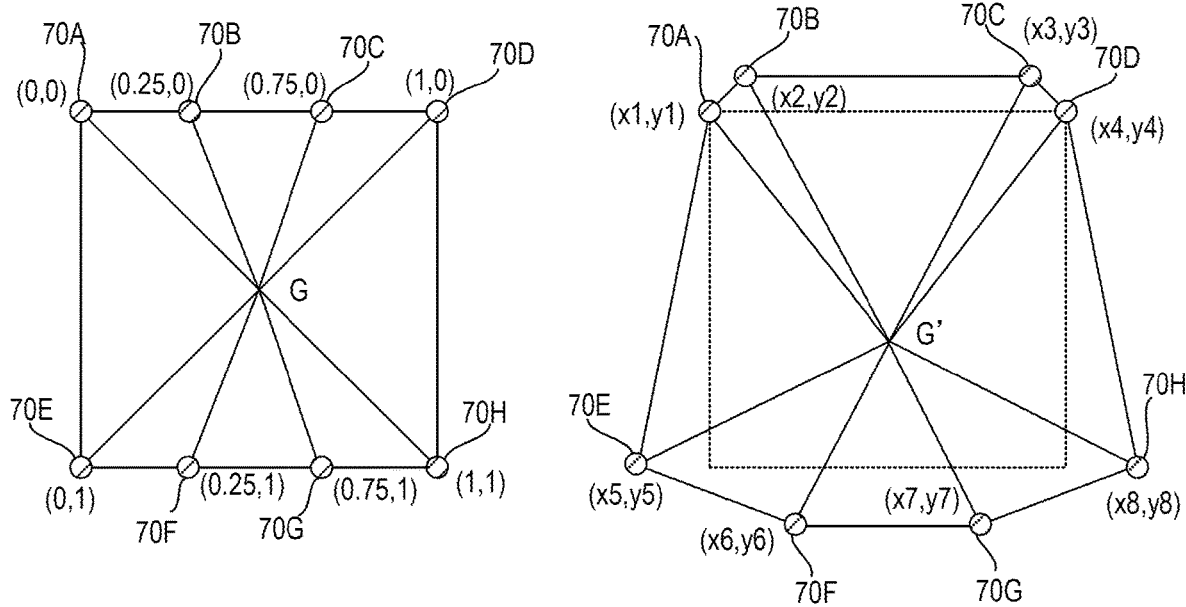
FIG. 4 is a diagram illustrating a concept of coordinate transformation.
Figure 5:
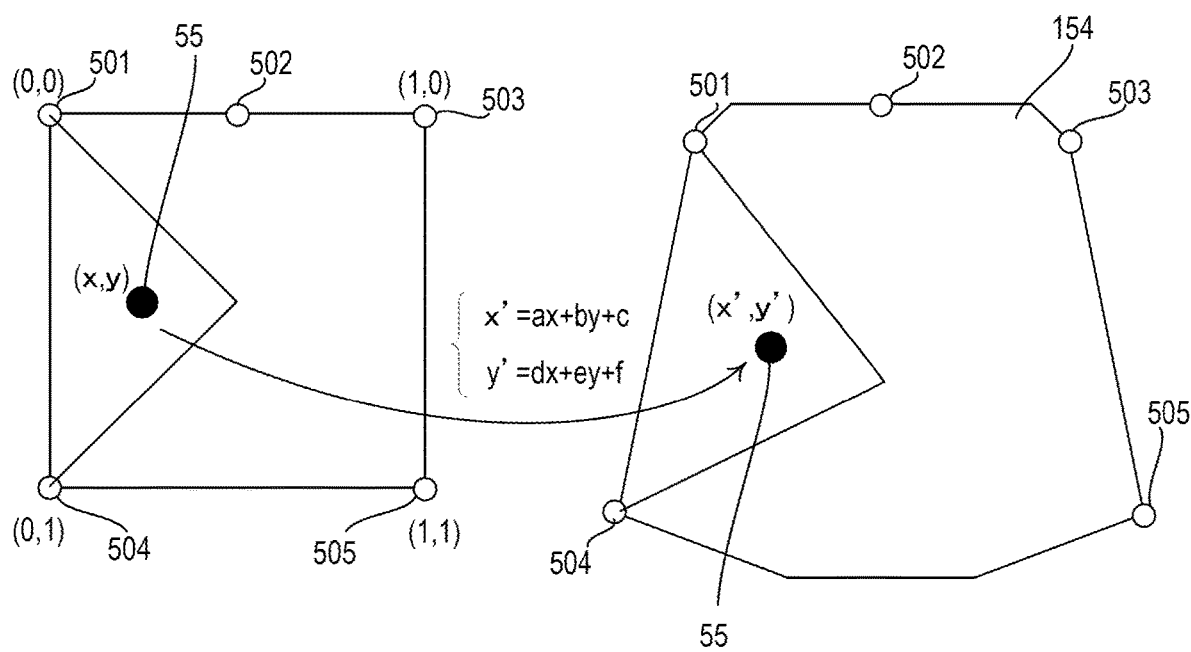
FIG. 5 is a diagram illustrating a concept of coordinate transformation.

FIG. 4 and FIG. 5 are diagrams illustrating a concept of coordinate transformation. The processor 12 transforms the speaker placement information and the sound source position information by transforming first coordinates in the logical coordinate system defined by the first space information into second coordinates in the physical coordinate system defined by the second space information. In the example of FIG. 4, the physical coordinate system shows eight reference points, 70A(x1, y1), 70B(x2, y2), 70C(x3, y3), 70D(x4, y4), 70E(x5, y5), 70F(x6, y6), 70G(x7, y7), and 70H(x8, y8), and the logical coordinate system before transformation shows eight reference points 70A(0, 0), 70B(0.25, 0), 70C(0.75, 0), 70D(1, 0), 70E(0, 1), 70F(0.25, 1), 70G(0.75, 1), and 70H(1, 1). The processor 12 determines a centroid G of the eight reference points in the logical coordinate system before transformation and a centroid G' of the eight reference points in the physical coordinate system after transformation, and then generates triangular meshes by using these centroids as centers. The processor 12 transforms an internal space of a triangle in the logical coordinate system and an internal space of a triangle in the physical coordinate system by a predetermined coordinate transformation. The transformation uses an affine transformation, for example. The affine transformation is an example of a geometric transformation. The affine transformation defines an x-coordinate (x') and a y-coordinate (y') after transformation by a function of an x-coordinate (x) and a y-coordinate (y) before transformation. In other words, the affine transformation performs the coordinate transformation by the following formulas: x'=ax+by +c; and y'=dx+ey+f. The coordinates of the three apexes of the triangle before transformation and the coordinates of the three apexes of the triangle after transformation are able to uniquely obtain coefficients a to f. The processor 12 obtains affine transformation coefficients similarly for all the triangles, and thus transforms the first coordinates in the logical coordinate system into the second coordinates in the physical coordinate system of the second space information. It is to be noted that the coefficients a to f may be obtained by the least-squares method.

Then, the processor 12 transforms the coordinates of the speaker placement information and the sound source position information by using the obtained coefficients a to f. In FIG. 5, the processor 12, by using the formulas, transforms coordinates (x, y) of the sound source 55 in the logical coordinate system into coordinates (x', y') in the physical coordinate system.

As a result, the coordinates of the speaker placement information and the sound source position information are transformed into second acoustic image localization information according to the shape of the physical space. The processor 12 stores the second acoustic image localization information in the flash memory 14, for example. Alternatively, the processor 12 sends the second acoustic image localization information to another apparatus such as an acoustic device, for example, through the communicator 11. The acoustic device performs processing to localize an acoustic image, based on the received second acoustic image localization information. Such localization processing is based on an object-based system. The acoustic device, based on the speaker placement information and the position information of each object (a sound source) that are included in the second acoustic image localization information, calculates level balance between audio signals to be outputted to the plurality of speakers so as to localize an acoustic image of the sound source of each object to a designated position, and performs panning processing to adjust levels of the audio signals. A listener feels localization in a direction of the speaker that outputs an audio signal of the higher level. The panning processing uses the perception of such a listener and adjusts the level of the audio signal to be outputted to each speaker according to a distance between a sound source and a speaker. For example, the processor 12 maximizes the level of the audio signal to be outputted to a speaker nearest to the position of a sound source, and reduces the level of the audio signal to be outputted to each speaker according to a distance to the sound source. Accordingly, the listener perceives the acoustic image of the object in the position of the sound source of each object included in the second acoustic image localization information. Therefore, the information processing apparatus 1 according to the present embodiment is able to be achieve acoustic image localization in consideration of the shape of a physical space.

Figure 6:
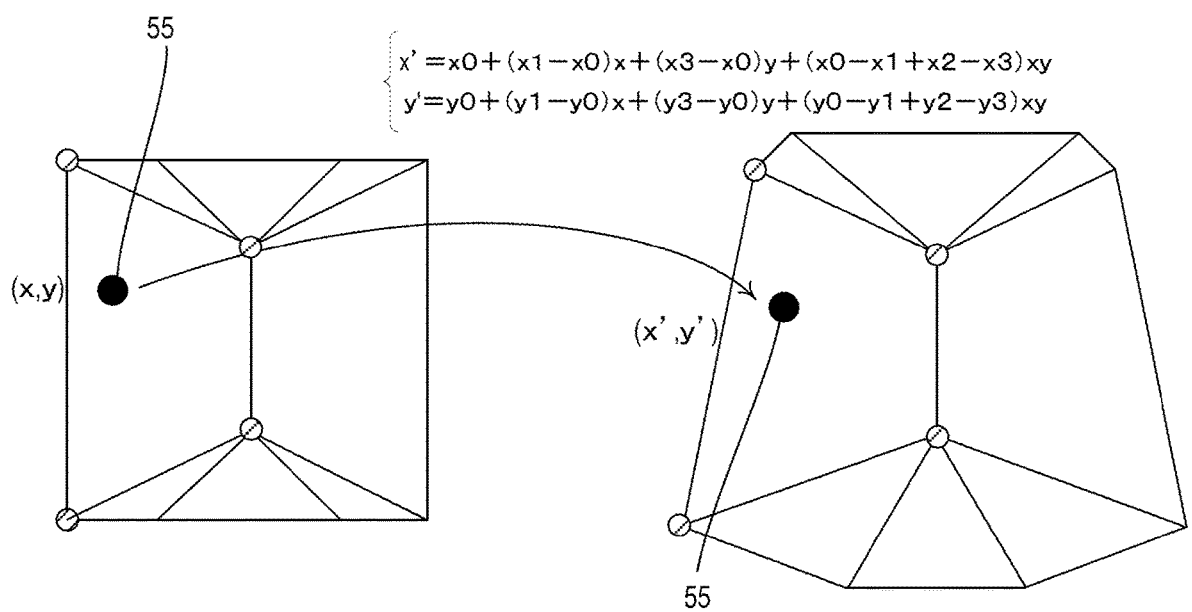
FIG. 6 is a diagram illustrating a modification of the coordinate transformation.

It is to be noted that the meshes may be meshes of any other polygonal shape other than a triangle, or a combination of the polygonal shape. For example, the processor 12, as shown in FIG. 6, may generate quadrangular meshes and may perform coordinate transformation. A transformation method is not limited to the affine transformation. For example, the processor 12 may transform each of the quadrangular meshes based on the following formulas and may transform coordinates (x, y) of the sound source 55 in the logical coordinate system into coordinates (x', y') in the physical coordinate system (however, x0, y0, x1, y1, x2, y2, x3, and y3 each denote coordinates of transformation points).

$$x'=x0+(x1-x0)x+(x3-x0)y+(x0-x1+x2-x3)xy$$

$$y'=y0+(y1-y0)x+(y3-y0)y+(y0-y1+y2-y3)xy$$

The transformation method may be any other geometric transformation such as isometric mapping, homothetic transformation, or projective transformation. For example, the projective transformation may be represented by the following formulas: x'=(ax+by+c)/(gx+hy+1) and y'=(dx+ey+f)/(gx+hy+1). The coefficients are obtained in the same way as in a case of affine transformation. For example, the eight coefficients (a to h) that configure the quadrangular projective transformation are uniquely obtained by a set of eight simultaneous equations. Alternatively, the coefficients may be obtained by the least-squares method.

Figure 7:
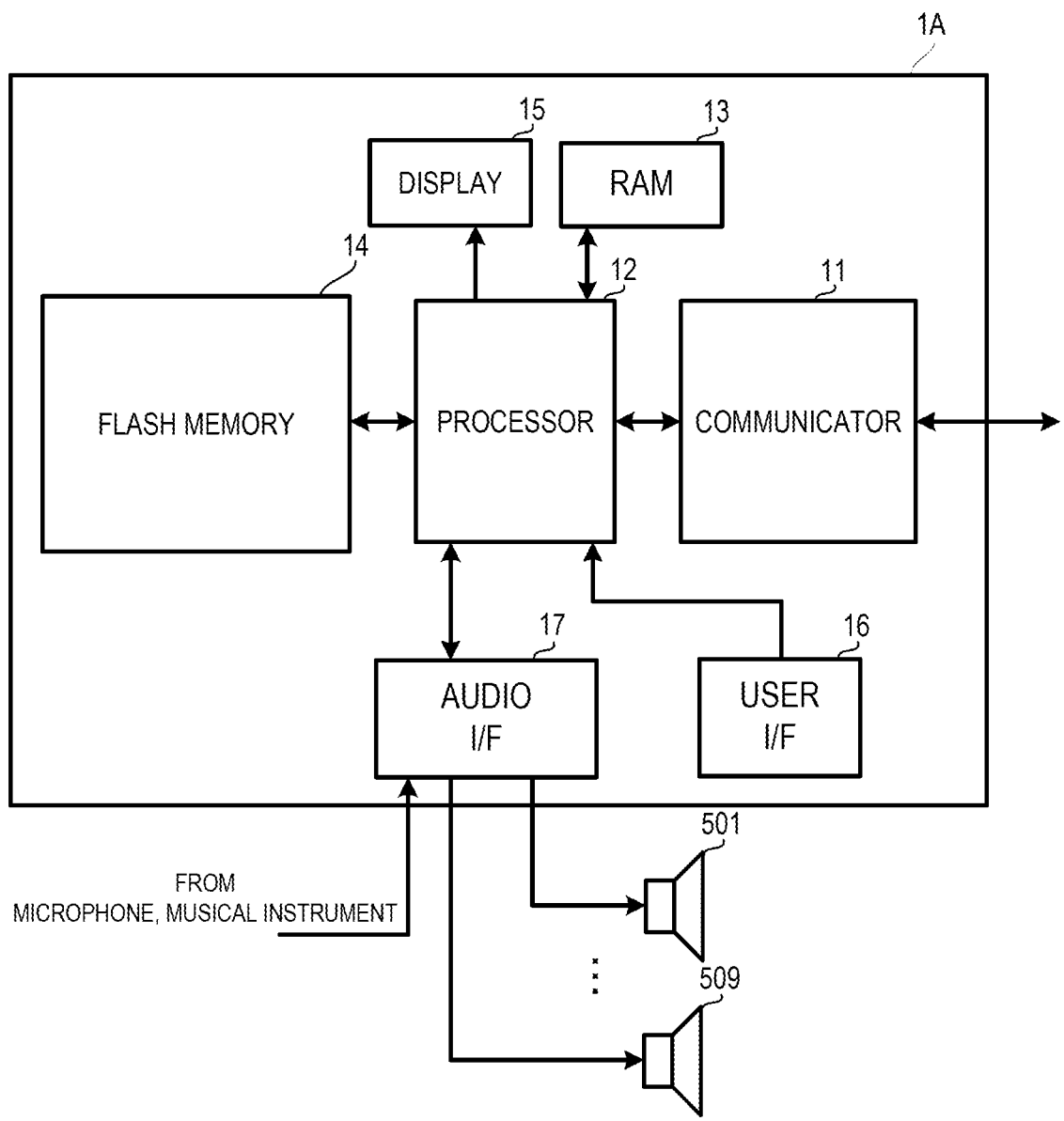
FIG. 7 is a block diagram showing a configuration of an information processing apparatus 1A according to a first modification.
Figure 8:
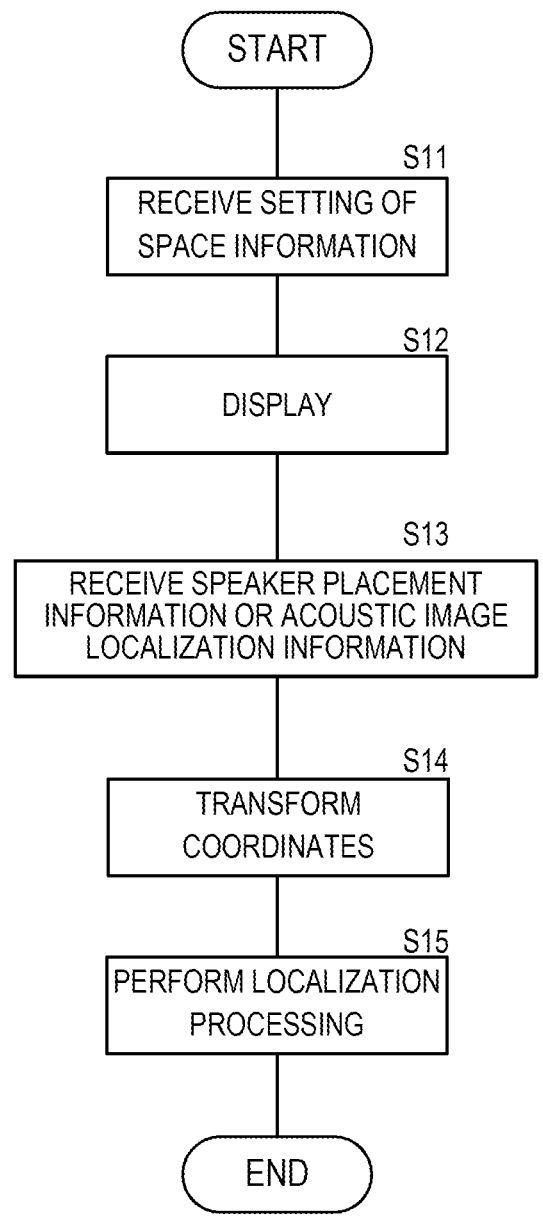
FIG. 8 is a flow chart showing an operation of the information processing apparatus 1A.

FIG. 7 is a block diagram showing a configuration of an information processing apparatus 1A according to a first modification. FIG. 8 is a flow chart showing an operation of the information processing apparatus 1A. The same configuration, function and operation as the configuration, function and operation of the information processing apparatus 1 are denoted by the same reference numerals, and the description will be omitted.

The information processing apparatus 1A further includes an audio I/F 17. The audio I/F 17 is an analogue audio terminal, a digital audio terminal, or the like. The processor 12 obtains an audio signal from a sound source of a microphone, a musical instrument, or the like, for example, through the audio I/F 17. Thus, the processor 12 functions as an audio signal obtainer. In addition, the audio signal may be obtained from an external apparatus through the communicator 11. Moreover, the audio signal may be stored in the flash memory 14.

The audio I/F 17 is connected to a plurality of speakers 501 to 509 that are installed in a real space such as a concert hall.

The processor 12 includes a DSP. The processor 12 performs predetermined signal processing on an audio signal. The processor 12 outputs the audio signal on which the signal processing has been processed, to a plurality of speakers 501 to 509 through the audio I/F 17.

The processor 12, based on each of the speaker placement information and the sound source position information (the second acoustic image localization information) in the physical coordinate system, performs processing to localize the acoustic image of the audio signal to a position corresponding to the second acoustic image localization information (S15). Specifically, the processor 12, based on the speaker placement information and the sound source position information that are included in the second acoustic image localization information, calculates level balance between audio signals to be outputted to the plurality of speakers 501 to 509 so as to localize an acoustic image of the sound source to the designated position, and performs panning processing to adjust levels of the audio signals. In this manner, the information processing apparatus may perform acoustic image localization processing. It is to be noted that the information processing apparatus may adjust output timing of an audio signal to be outputted to a plurality of speakers so as to localize an acoustic image of each sound source to the designated position.

Figure 10:
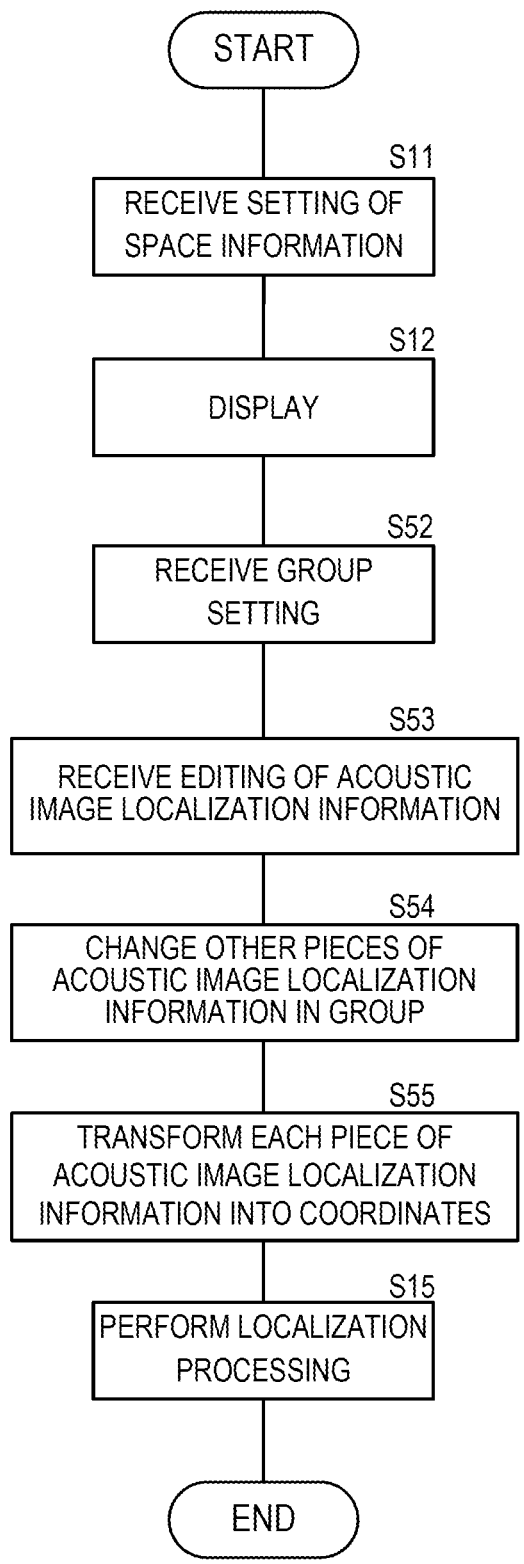
FIG. 10 is a flow chart showing an operation of the information processing apparatus 1A.

The information processing apparatus 1A is also able to output the audio signal of a sound source to each of a plurality of physical spaces corresponding to a plurality of logical spaces. FIG. 9 is a diagram showing an example of the acoustic image localization setting screen displayed on the display 15. FIG. 10 is a flow chart showing an operation of the information processing apparatus 1A. The same configuration, function and operation as the configuration, function and operation of the information processing apparatus 1 are denoted by the same reference numerals, and the description will be omitted.

The processor 12 receives settings of a plurality of pieces of information on the plurality of physical spaces that correspond to a plurality of pieces of information on the plurality of logical spaces, respectively. In the example of FIG. 9, the processor 12 receives three physical spaces Z1, Z2, and Z3 respectively corresponding to three logical spaces L1, L2, and L3.

In the example of FIG. 9, the physical spaces Z1, Z2, and Z3 are defined by sectioning one certain concert hall R1 into three regions. For example, the physical space Z1 corresponds to a first floor seat of the concert hall, and the physical space Z2 corresponds to a second floor seat of the concert hall. The physical space Z3 corresponds to the entire concert hall. It is to be noted that, although the plurality of physical spaces correspond to a plurality of regions set to one certain sound space (the concert hall R1) in this example, the plurality of physical spaces may correspond to respective completely different acoustic spaces.

In the concert hall R1, the plurality of speakers 501 to 509 are placed. The speaker 501 to the speaker 509 are arranged along a wall surface of the concert hall R1. For example, the speaker 501 is placed on a front left side of the concert hall R1. The speaker 502 is placed on a front center of the concert hall R1. The speaker 503 is placed on a front right side of the concert hall R1. The speaker 504 and the speaker 506 are placed on a left side of the longitudinal center of the concert hall R1. The speaker 505 and the speaker 507 are placed on a right side of the longitudinal center of the concert hall R1. The speaker 508 is placed on a rear left side of the concert hall R1. The speaker 509 is placed on a rear right side of the concert hall R1.

In the example of FIG. 9, the speakers 501 to 505 configure a region Z1. In addition, the speakers 506 to 509 configure a region Z2. Moreover, all the speakers 501 to 509 configure a region Z3. The processor 12 performs localization processing on a sound source placed in the region Z1 by using the speakers 501 to 505. The processor 12 performs localization processing on a sound source placed in the region Z2 by using the speakers 506 to 509. The processor 12 performs localization processing on a sound source placed in the region Z3 by using the speakers 501 to 509.

The user, by editing the positions of the sound source 55A, the sound source 55B, and the sound source 55C that are respectively placed in the three logical spaces L1, L2, and L3, can control the positions of the sound source 55A, the sound source 55B, and the sound source 55C of the physical spaces Z1, Z2, and Z3. In other words, the user, by editing the positions of the sound sources of the three logical spaces L1, L2, and L3, can control each of the position of a sound source desired to be listened to by a listener in the first floor seat of the concert hall, the position of a sound source desired to be listened to by a listener in the second floor seat of the concert hall, and the position of a sound source desired to be listened to by listeners in the entire concert hall.

Then, the processor 12 receives the first acoustic image localization information of the plurality of sound sources in the plurality of logical spaces, as a group (S52). In the example of FIG. 9, the processor 12 receives the sound source 55A, the sound source 55B, and the sound source 55C, as one group.

Then, the processor 12 receives a change in one piece of the first acoustic image localization information in the group (S53), and changes other pieces of the first acoustic image localization information in the group corresponding to the received change in the one piece of the first acoustic image localization information (S54). For example, when the user changes the position of the sound source 55A in the logical space L1, the processor 12 changes the positions of other sound source 55B and sound source 55C in the same group. The processor 12 maintains a relative positional relationship between each of a plurality of acoustic images in the same group, and changes the first acoustic image localization information.

For example, the user, as shown in FIG. 11, changes the coordinates of the sound source 55A in the logical space L1 from (x1, y1)=(0.75, 0.25) to (x1, y1)=(0.25, 0.75). The processor 12 maintains the relative positional relationship among the sound source 55A, the sound source 55C, and the sound source 55B that are included in the same group, and changes the coordinates of the sound source 55B and the sound source 55C. In this example, the coordinates of the sound source 55A, the sound source 55C, and the sound source 55B are all the same (0.75, 0.25). In such a case, the relative position is (0, 0). Therefore, the processor 12 also changes the coordinates of the sound source 55B to (x2, y2)=(0.25, 0.75), and also changes the coordinates of the sound source 55C to (x3, y3)=(0.25, 0.75).

Even in a case in which each of the grouped plurality of pieces of first acoustic image localization information has different first coordinates, the processor 12 maintains the relative positional relationship between the grouped plurality of pieces of first acoustic image localization information, and changes other pieces of first acoustic image localization information. For example, in a case in which the coordinates of the sound source 55A are (x1, y1)=(0.75, 0.75), and the coordinates of the sound source 55B are (x2, y2)=(0.5, 0.5), the relative position is indicated by (x1−x2, y1−y2)=(0.25, 0.25). In addition, in a case in which the coordinates of the sound source 55C are (x3, y3)=(1, 1), the relative position is indicated by (x1−x3, y1−y3)=(−0.25, −0.25). Therefore, when the user changes the coordinates of the sound source 55A in the logical space L1 from (x1, y1)=(0.75, 0.75) to (x1, y1)=(0.25, 0.25), the processor 12 also changes the coordinates of the sound source 55B to (x2, y2)=(0, 0), and changes the coordinates of the sound source 55C to (x3, y3)=(0.5, 0.5).

It is to be noted that, in the case in which each of the grouped plurality of sound sources has different first coordinates, and the positions of other sound sources are changed while the relative positional relationship between the plurality of sound sources is maintained, the positions of other sound sources may be outside the logical space. The processor 12, in a case in which the positions of other sound sources are outside the logical space, causes at least one of the x-coordinate or the y-coordinate to correspond to 0 or 1. For example, the processor 12, in a case in which changed coordinates of the sound source 55C are (x3, y3)=(−0.25, −0.25), changes the changed coordinates of the sound source 55C to (x3, y3)=(0, 0). In other words, the processor 12 changes the coordinates of a sound source to 0 when the changed coordinates of the sound source are negative values, and changes the coordinates to 1 when the changed coordinates exceed 1.

The processor 12 transforms the plurality of pieces of first acoustic image localization information in the group that are changed as described above, into the plurality of pieces of second acoustic image localization information by use of second coordinates in the plurality of physical spaces corresponding respectively (S55).

The processor 12 performs the above affine transformation on each of the logical space and the physical space, for example, and transforms the coordinates (x, y) of each sound source in the logical coordinate system into the coordinates (x′, y′) in the physical coordinate system. As a result, each sound source placed in the plurality of logical spaces is transformed into the second acoustic image localization information according to the shape of each physical space.

For example, as shown in FIG. 11, in the physical space Z1, the position of the sound source 55A is moved from the right front to the left rear. In addition, in the physical space Z2, the position of the sound source 55B is moved from the right front to the left rear. Moreover, in the physical space Z3, the position of the sound source 55C is moved from the right front to the left rear.

In this manner, the processor 12 according to the present embodiment is able to collectively control the positions of the sound sources in the plurality of physical spaces by collectively transforming the grouped plurality of logical coordinates into respective physical coordinates. Accordingly, the user can collectively control movement of the sound sources to the plurality of physical spaces of different shapes. For example, the user of the information processing apparatus 1A, only by performing an operation of moving the sound source in the logical space L1 from the right front to the left rear, can provide such production that a sound source moves from the right front to the left rear, to both the listener in the physical space Z1 (the first floor seat of the concert hall), and the listener in the physical space Z2 (the second floor seat of the concert hall).

In addition, the user of the information processing apparatus 1A may designate in which region (in which physical space) each sound source is to be reproduced. In such a case, the processor 12, in each of a plurality of regions, receives a setting of reproduction information that shows of which a sound source the audio signal is to be outputted.

Figure 12:
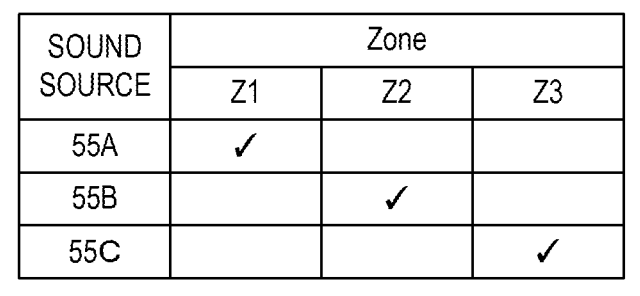

FIG. 12 is a view showing an example of reproduction information. As shown in FIG. 12, the reproduction information shows to which a region an audio signal is to be outputted for each sound source. In other words, the reproduction information shows of which a sound source the audio signal is to be outputted for each region. The processor 12 displays the reproduction information on the display 15. The user edits the reproduction information by using the user I/F 16. The user designates a region to which an audio signal is outputted, for each sound source. In other words, the user, in each of a plurality of regions, designates of which a sound source the audio signal is to be outputted.

In the example of FIG. 12, the region Z1 outputs an audio signal of the sound source 55A. The region Z2 outputs an audio signal of the sound source 55B. The region Z3 outputs an audio signal of the sound source 55C. In other words, the audio signal of the sound source 55A is outputted only to the region Z1. The sound source 55B is outputted only to the region Z2. The sound source 55C is outputted to all the regions.

The processor 12 reproduces the audio signal of each sound source based on the reproduction information edited as described above. The processor 12 outputs the audio signal of the sound source 55A to the speakers 501 to 505. Accordingly, the sound source 55A is able to be heard in the region Z1. The processor 12 outputs the audio signal of the sound source 55B to the speakers 506 to 509. Accordingly, the sound source 55B is able to be heard in the region Z2. The processor 12 outputs the audio signal of the sound source 55C to the speakers 501 to 509. Accordingly, the sound source 55C is able to be heard at any position of the region Z3.

In this manner, the information processing apparatus 1A is able to output an audio signal of any sound sources to each of the plurality of regions. For example, in a case in which the R1 shown in FIG. 9 is a building of an attraction in a certain theme park, the user of the information processing apparatus 1A can reproduce a footstep as the sound source 55C in all the regions. Therefore, a user of the attraction hears a footstep at any position in the attraction. In addition, the user of the information processing apparatus 1A can designate a region for each object in the attraction and can reproduce a sound. For example, with a sound of a helicopter as the sound source 55A, the user of the information processing apparatus 1A can cause the sound of the helicopter to be heard only in the region Z1 in the attraction. For example, with a sound of a car as the sound source 55B, the user of the information processing apparatus 1A can cause the sound of the car to be heard only in the region Z2 in the attraction. As a result, the user of the attraction can hear a sound of a different object for each region while hearing the same sound (a footstep, for example) in all the regions in the attraction.

FIG. 13 is a view showing a modification example of the reproduction information. As shown in FIG. 13, the reproduction information may include information that shows to which a region an audio signal is to be outputted for each speaker. In other words, the reproduction information includes speaker designation information by which a speaker to be used for each of the plurality of regions is designated.

In the example of FIG. 13, the region Z1 uses the speakers 501 to 505. The region Z2 uses the speakers 506 to 509. The region Z3 uses all the speakers 501 to 509. For example, when the user of the information processing apparatus 1A designates the speakers 501, 502, 503, 504, 505, 506, and 507 as the speaker to be used in the region Z1, the range of the region Z1 is increased. For example, when the user of the information processing apparatus 1A designates the speakers 501 to 509 as the speaker to be used in the region Z1, the range of the region Z1 is increased in the entire R1.

In this manner, the user can also easily change a position that each region covers, by designating the speaker to be used for each region.

On the other hand, as shown in FIG. 14, the user may designate the speakers 501, 503, 508, and 509 as the speaker to be used in the region Z3, for example. In such a case, the processor 12 outputs the audio signal (the audio signal of the sound source 55C in the example of FIG. 12) of the sound source designated in the region Z3 to the speakers 501, 503, 508, and 509 at four corners in the R1, to the speakers 501, 503, 508, and 509 of the four corners of R1. In this case as well, the region Z3 remains as the entire R1. Therefore, in this case as well, the user of the information processing apparatus 1A can reproduce the sound source 55C of a footstep in all the regions, for example, in the attraction of a theme park.

The description of the foregoing embodiments is illustrative in all points and should not be construed to limit the present disclosure. The scope of the present disclosure is defined not by the foregoing embodiments but by the following claims for patent. Further, the scope of the present disclosure includes the scopes of the claims for patent and the scopes of equivalents.

For example, the number of sound sources placed in one logical space is not limited to one. FIG. 15 is a diagram showing an example of the acoustic image localization setting screen displayed on the display 15 in a case in which a plurality of sound sources 55A and sound sources 55AB are placed in a logical space L1 and acoustic image localization position information is edited.

In this example, the user places acoustic image localization positions of the sound source 55A and the sound source 55AB in the logical space L1. For example, the sound source 55A is indicated by coordinates (x1, y1)=(0.25, 0.25). The sound source 55AB is indicated by coordinates (x2, y2)= (0.25, 0.75).

The user edits each of the sound source 55A and the sound source 55AB that are placed in the logical space L1. For example, the user changes the positions of the sound source 55A and the sound source 55AB that are placed in the logical space L1, to respective different positions. The processor 12 transforms the first acoustic image localization information of the changed sound source 55A and sound source 55AB, respectively, into the second acoustic image localization information of the physical space Z1.

In addition, the processor 12 may define a plurality of sound sources in one logical space as the same second group. FIG. 16 is a diagram showing an example of the acoustic image localization setting screen displayed on the display 15 in a case in which the acoustic image localization position information of the sound sources 55A and the sound source 55AB that are defined as the second group is edited.

In such a case, the sound source 55A and the sound source 55AB are defined as the same second group. The user edits either the sound source 55A or the sound source 55AB in the logical space L1. The processor 12 maintains the relative positional relationship between each of a plurality of acoustic images included in the same second group, and changes the first acoustic image localization information. For example, the user, as shown in FIG. 16, changes the coordinates (x1, y1)=(0.75, 0.25) of the sound source 55A placed in the logical space L1 to the coordinates (x1, y1)=(0.25, 0.75). The processor 12 maintains the relative positional relationship between the sound source 55A and the sound source 55AB that are included in the same second group, and changes the coordinates of the sound source 55AB. The sound source 55AB is indicated by coordinates (x2, y2)= (0.75, 0.5). In such a case, the relative position is indicated by (x1-x2, y1-y2)=(0, −0.25). Therefore, the processor 12 changes the position of the sound source 55AB to the coordinates (x2, y2)=(0.25, 1). The display 15 displays the sound source 55A and the sound source 55AB in the logical space L1 according to the changed coordinates of the sound source 55A and the sound source 55AB.

Then, the processor 12 transforms sound source position coordinates (first acoustic image localization information) of the changed sound source 55A and the sound source 55AB in the logical coordinate system, respectively, into sound source position information (second acoustic image localization information) in the physical coordinate system. Alternatively, the processor 12 may transform the coordinates of the changed sound source 55A and the coordinates indicating the relative positional relationship between the sound source 55A and the sound source 55AB in the logical coordinate system into corresponding coordinates in the physical coordinate system. In such a case, the processor 12 may determine for the position of the sound source 55AB in the physical coordinate system based on the coordinates of the sound source 55A in the physical coordinate system, and the relative positional relationship between the sound source 55A and the sound source 55AB in the physical coordinate system. Subsequently, the display 15, as shown in FIG. 16, changes the positions of the sound source 55A and the sound source 55AB in the physical space Z1.

The above embodiments describe the display of a sound source and coordinate transformation in the two-dimensional space (in a plane). However, the display of a sound source and coordinate transformation may be performed in a three-dimensional space. In addition, three-dimensional space information may include plane coordinates (x, y), and information that shows a plurality of layers stacked in the height direction.

What is claimed is:

1. An information processing method of acoustic-image localizing a plurality of physical spaces, the information processing method comprising:
receiving settings of a plurality of pieces of information on a plurality of logical spaces that define first coordinates in the plurality of logical spaces;
receiving settings of a plurality of pieces of information on the plurality of physical spaces that respectively correspond to the plurality of pieces of information on the plurality of logical spaces and that define second coordinates in the plurality of physical spaces;
receiving a first group of a plurality of pieces of first acoustic image localization information that indicates a position of an acoustic image to be localized in each of the plurality of logical spaces using the first coordinates;
receiving a change in one piece of first acoustic image localization information, among the first group of the plurality of pieces of first acoustic image localization information;
changing other pieces of first acoustic image localization information, among the first group of the plurality of pieces of first acoustic image localization, in response to the received change in the one piece of first acoustic image localization information; and transforming the first group of the plurality of pieces of first acoustic image localization information respectively into a plurality of pieces of second acoustic image localization information using the second coordinates.

2. The information processing method according to claim 1, wherein each of the first group of the plurality of pieces of first acoustic image localization information has same first coordinates.

3. The information processing method according to claim 1, wherein:

each of the first group of the plurality of pieces of first acoustic image localization information has different first coordinates, and in response to the received change in the one piece of first acoustic image localization information, the changing changes the other pieces of first acoustic image localization information while maintaining a relative positional relationship between the first group of the plurality of pieces of first acoustic image localization information.

4. The information processing method according to claim 1, wherein:

at least one logical space, among the plurality of logical spaces, includes a second group of a plurality of pieces of first acoustic image localization information that includes positions of a plurality of acoustic images, the receiving of the change receives a change in one piece of first acoustic image localization information, among the second group of the plurality of pieces of first acoustic image localization information, the changing changes, in response to the receiving of the change in the one piece of first acoustic image localization information in the second group, other pieces of the first acoustic image localization, among the second group of the plurality of pieces of first acoustic image localization information, while maintaining a relative positional relationship between each of the plurality of acoustic images included in the second group, and the transforming transforms the second group of the plurality of pieces of first acoustic image localization information into the plurality of pieces of second acoustic image localization information in at least one physical space corresponding respectively to the at least one logical space.

5. An information processing apparatus for acoustic-image localizing a plurality of physical spaces, the information processing apparatus comprising a processor configured to:

receive settings of a plurality of pieces of information on a plurality of logical spaces that define first coordinates in the plurality of logical spaces;

receive settings of a plurality of pieces of information on the plurality of physical spaces that respectively correspond to the first plurality of pieces of information on the plurality of logical spaces and that define second coordinates in the plurality of physical spaces;

receive a first group of a plurality of pieces of first acoustic image localization information that indicates a position of an acoustic image to be localized in each of the plurality of logical spaces using the first coordinates;

receive a change in one piece of first acoustic image localization information, among the first group of the plurality of pieces of first acoustic image localization information;

change other pieces of first acoustic image localization information, among the first group of the plurality of pieces of first acoustic image localization, in response to the received change in the one piece of first acoustic image localization information; and transform the first group of the plurality of pieces of first acoustic image localization information respectively into a plurality of pieces of second acoustic image localization information using the second coordinates.

6. The information processing apparatus according to claim 5, wherein each of the first group of the plurality of pieces of first acoustic image localization information has same first coordinates.

7. The information processing apparatus according to claim 5, wherein:

each of the first group of the plurality of pieces of first acoustic image localization information has different first coordinates, and in response to the received change in the one piece of first acoustic image localization information, the processor changes the other pieces of first acoustic image localization information while maintaining a relative positional relationship between the first group of the plurality of pieces of first acoustic image localization information.

8. The information processing apparatus according to claim 5, wherein:

at least one logical space, among the plurality of logical spaces, includes a second group of a plurality of pieces of first acoustic image localization information that indicates positions of a plurality of acoustic images, the processor receives a change in one piece of first acoustic image localization information, among the second group of the plurality of pieces of first acoustic image localization information, the processor changes, in response to the received change in the one piece of first acoustic image localization information in the second group, other pieces of the first acoustic image localization, among the second group of the plurality of pieces of first acoustic image localization information, while maintaining a relative positional relationship between each of the plurality of acoustic images included in the second group, and the processor transforms the second group of the plurality of pieces of first acoustic image localization information into the plurality of pieces of second acoustic image localization information in at least one physical space corresponding respectively to the at least one logical space.

9. An information processing method of acoustic-image localizing a plurality of physical spaces, the information processing method comprising:

receiving settings of a plurality of pieces of information on the plurality of physical spaces that respectively correspond to a plurality of pieces of information on a plurality of logical spaces;

receiving a first group of a plurality of pieces of first acoustic image localization information that indicates a position of an acoustic image to be localized in each of the plurality of logical spaces using first coordinates in the plurality of logical spaces;

receiving a change in one piece of first acoustic image localization information, among the first group of the plurality of pieces of first acoustic image localization information;

changing other pieces of first acoustic image localization information, among the first group of the plurality of pieces of first acoustic image localization, in response to the received change in the one piece of first acoustic image localization information; and transforming the first group of the plurality of pieces of first acoustic image localization information respectively into a plurality of pieces of second acoustic image localization information using second coordinates in the plurality of physical spaces, wherein at least one logical space, among the plurality of logical spaces, includes a second group of a plurality of pieces of first acoustic image localization information that includes positions of a plurality of acoustic images, wherein the receiving of the change receives a change in one piece of first acoustic image localization information, among the second group of the plurality of pieces of first acoustic image localization information, wherein the changing changes, in response to the receiving of the change in the one piece of first acoustic image localization information in the second group, other pieces of the first acoustic image localization, among the second group of the plurality of pieces of first acoustic image localization information, while maintaining a relative positional relationship between each of the plurality of acoustic images included in the second group, and wherein the transforming transforms the second group of the plurality of pieces of first acoustic image localization information into the plurality of pieces of second acoustic image localization information in at least one physical space corresponding respectively to the at least one logical space.

* * * * *